United States Patent
Volinski et al.

(10) Patent No.: US 10,263,236 B2
(45) Date of Patent: Apr. 16, 2019

(54) BATTERY CELL SECURING ASSEMBLY AND METHOD

(71) Applicant: Ford Global Technologies, LLC, Dearborn, MI (US)

(72) Inventors: Bridget Jo Volinski, Canton, MI (US); Christian Hines, Hamburg, MI (US); John Scott Turik, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/598,689

(22) Filed: May 18, 2017

(65) Prior Publication Data

US 2018/0337384 A1    Nov. 22, 2018

(51) Int. Cl.
*H01M 4/02* (2006.01)
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC ....................................................... H01M 4/02
See application file for complete search history.

(56) References Cited

U.S. PATENT DOCUMENTS

| | | |
|---|---|---|
| 1,939,105 A | 12/1933 | Christy |
| 3,338,452 A | 8/1967 | Oakley et al. |
| 4,347,294 A | 8/1982 | Mejia |
| 8,033,875 B1 | 10/2011 | Maguire |
| 2010/0105239 A1 | 4/2010 | Li et al. |
| 2015/0099162 A1* | 4/2015 | Wu .......... H01M 2/30 429/178 |
| 2016/0293910 A1 | 10/2016 | Claudel |

FOREIGN PATENT DOCUMENTS

CN        202817066        3/2013

* cited by examiner

*Primary Examiner* — Jacob B Marks
(74) *Attorney, Agent, or Firm* — Carlson, Gaskey & Olds, P.C.

(57) ABSTRACT

An exemplary battery assembly includes, among other things, a rail of a first cell assembly received within a slot of a second cell assembly to secure the first and a second cell assemblies relative to each other. A rail terminal is disposed within a rail surface that faces back toward an electrode structure of the first cell assembly. An exemplary battery cell securing method includes, among other things, positioning a rail of a first cell assembly within a slot of a second cell assembly to secure the first and second cell assemblies relative to each other. The rail has a rail surface that faces back toward an electrode structure of the first cell assembly, and a rail terminal disposed within the rail surface.

20 Claims, 8 Drawing Sheets

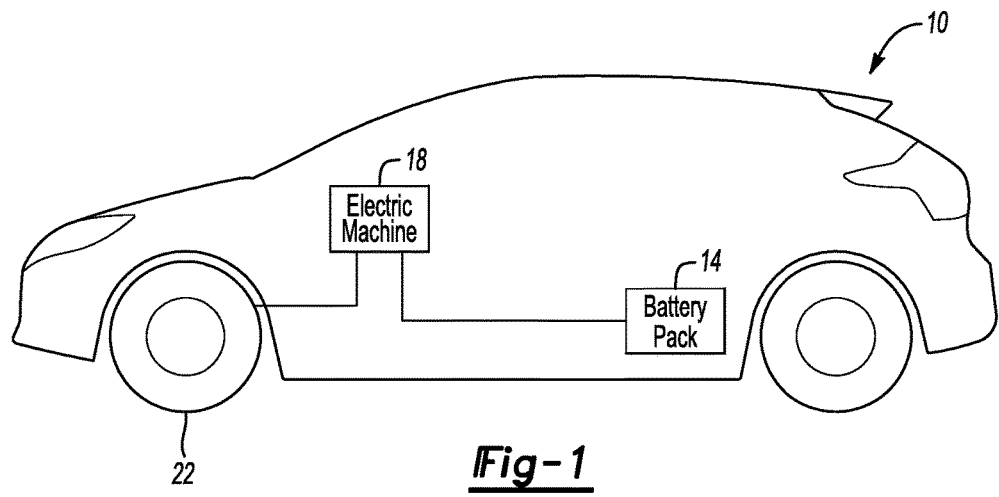
_Fig-1_
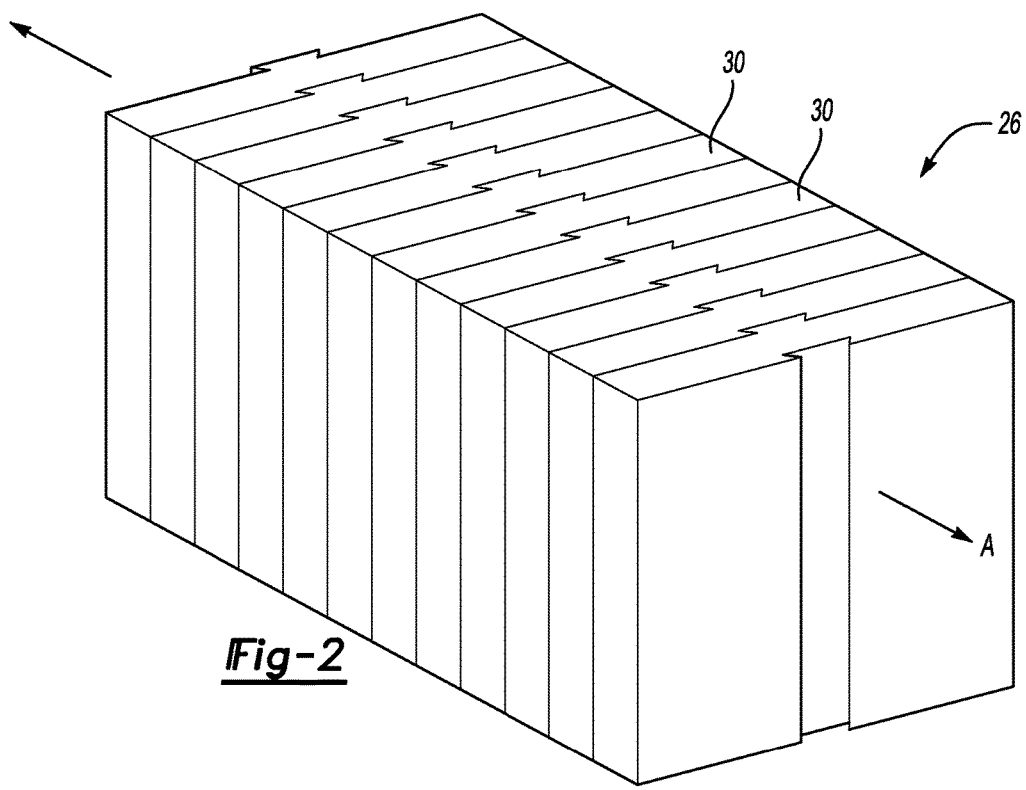
_Fig-2_

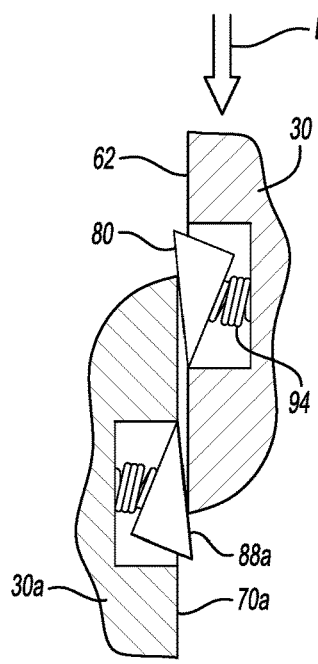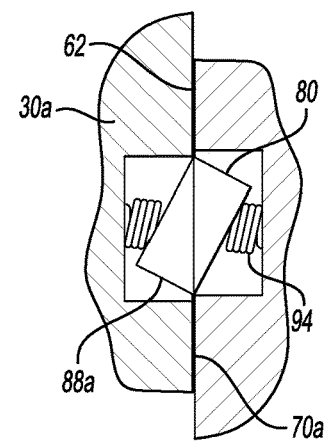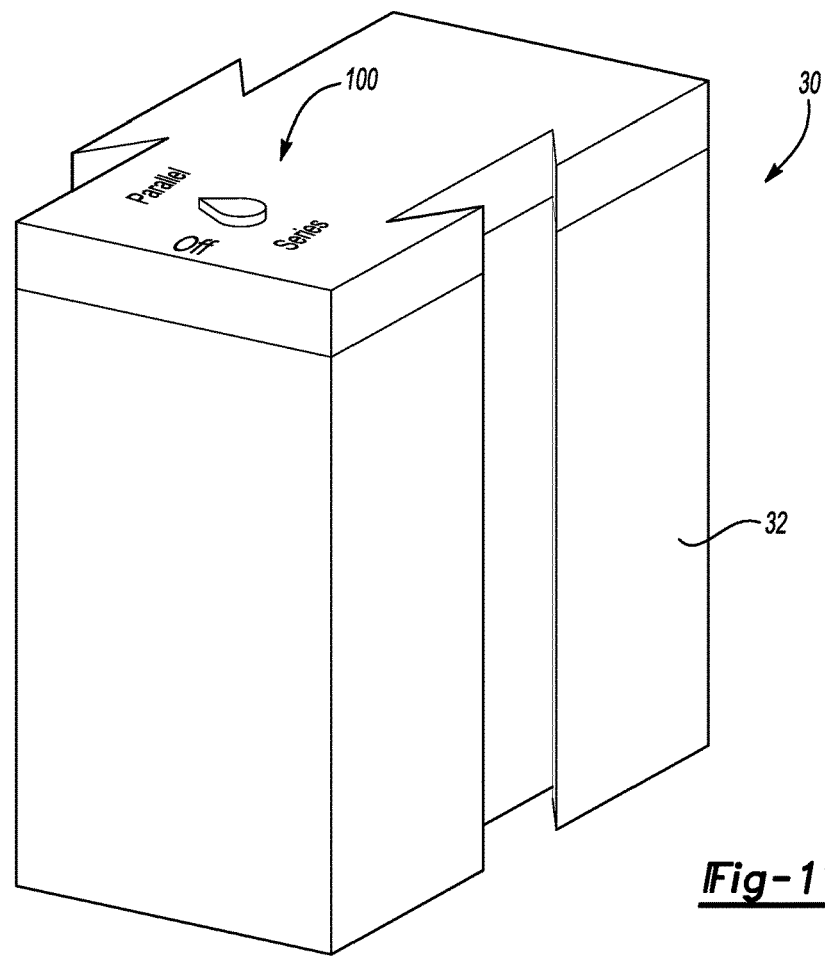

BATTERY CELL SECURING ASSEMBLY AND METHOD

TECHNICAL FIELD

This disclosure relates generally to battery cells secured to each other with rails received within slots. In particular, the disclosure relates to terminals of the battery cells disposed within a relatively protected area of the rails and slots. This configuration, in some examples, can permit a busbar function to be internal to the battery cells.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle typically includes one or more battery arrays. Each of the battery arrays can include a plurality of battery cells along a longitudinal axis. Each of the battery cells includes one or more terminal used to move current to and from the battery cells.

SUMMARY

A battery cell securing assembly according to an exemplary aspect of the present disclosure includes, among other things, a rail of a first cell assembly received within a slot of a second cell assembly to secure the first and second cell assemblies relative to each other. A rail terminal is disposed within a rail surface that faces back toward an electrode structure of the first cell assembly.

In another non-limiting embodiment of the foregoing assembly, the second cell assembly has a slot terminal disposed within a slot surface that faces an electrode structure of the second cell assembly. The slot terminal electrically contacts the rail terminal when the rail is received within the slot.

In another non-limiting embodiment of any of the foregoing assemblies, the rail extends from a first outermost side of the first cell assembly to an opposite, second outermost side of the first cell assembly. The slot extends from a first outermost side of the second cell assembly to an opposite, second outermost side of the second cell assembly.

In another non-limiting embodiment of any of the foregoing assemblies, the rail includes a first rail portion extending from a first area of the first battery cell, and a separate, second rail portion extending from a second area of the first battery cell.

In another non-limiting embodiment of any of the foregoing assemblies, the first and second cells are disposed along a longitudinal axis of an array when the rail is received within the slot. The surface of the rail is an axially facing surface.

In another non-limiting embodiment of any of the foregoing assemblies, the rail is slidably received within the slot in a direction.

In another non-limiting embodiment of any of the foregoing assemblies, the direction is transverse to the longitudinal axis.

In another non-limiting embodiment of any of the foregoing assemblies, the rail surface that faces the electrode structure in a direction having an axial component and a lateral component.

In another non-limiting embodiment of any of the foregoing assemblies, the rail has a dovetail configuration.

In another non-limiting embodiment of any of the foregoing assemblies, the rail terminal of the first cell assembly electrically contacts a slot terminal of the second cell assembly when the rail is received within the slot to communicate electrical current between the first and second cell assemblies such that no separate bus bar is required to communicate electrical current between the first and second cell assemblies.

In another non-limiting embodiment of any of the foregoing assemblies, the rail terminal is biased outward away from the rail surface that faces the electrode structure.

A battery cell securing method according to another exemplary aspect of the present disclosure includes, among other things, positioning a rail of a first cell assembly within a slot of a second cell assembly to secure the first and second cell assemblies relative to each other. The rail has a rail surface that faces back toward an electrode structure of the first cell assembly, and a rail terminal disposed within the rail surface.

A further non-limiting embodiment of the foregoing method includes positioning the rail within the slot such that the rail terminal electrically contacts a slot terminal disposed within a slot surface that faces an electrode structure of the second cell assembly.

In a further non-limiting embodiment of any of the foregoing methods, the rail extends from a first outermost side of the first cell assembly to an opposite, second outermost side of the first cell assembly. The slot extends from a first outermost side of the second cell assembly to an opposite, second outermost side of the second cell assembly.

In a further non-limiting embodiment of any of the foregoing methods, the rail includes a first rail portion extending from a first area of the first battery cell, and a separate, second rail portion extending from a second area of the first battery cell.

In a further non-limiting embodiment of any of the foregoing methods, the first and second cells are disposed along a longitudinal axis of an array when the rail is received within the slot. The surface of the rail is an axially facing surface.

In a further non-limiting embodiment of any of the foregoing methods, the rail is slidably received within the slot in a direction that is transverse to the longitudinal axis.

A further non-limiting embodiment of any of the foregoing methods includes, during the positioning, pressing the rail terminal into the rail to oppose a biasing force that biases the rail terminal outward away from the rail surface.

A further non-limiting embodiment of any of the foregoing methods includes pressing the rail terminal using a slot surface of the slot.

In a further non-limiting embodiment of any of the foregoing methods, the positioning comprises sliding the rail relative to the slot.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a highly schematic view of an electrified vehicle.

FIG. 2 illustrates a perspective view of a battery pack from the electrified vehicle of FIG. 1.

FIG. 9 illustrate the section view of FIG. 8 when the cell assembly is closer to the fully installed position.

FIG. 10 illustrates the section view of FIG. 8 when the cell assembly is in the fully installed position.

FIG. 11 illustrates a perspective view of a cell assembly according to another exemplary embodiment.

DETAILED DESCRIPTION

Figure 3:
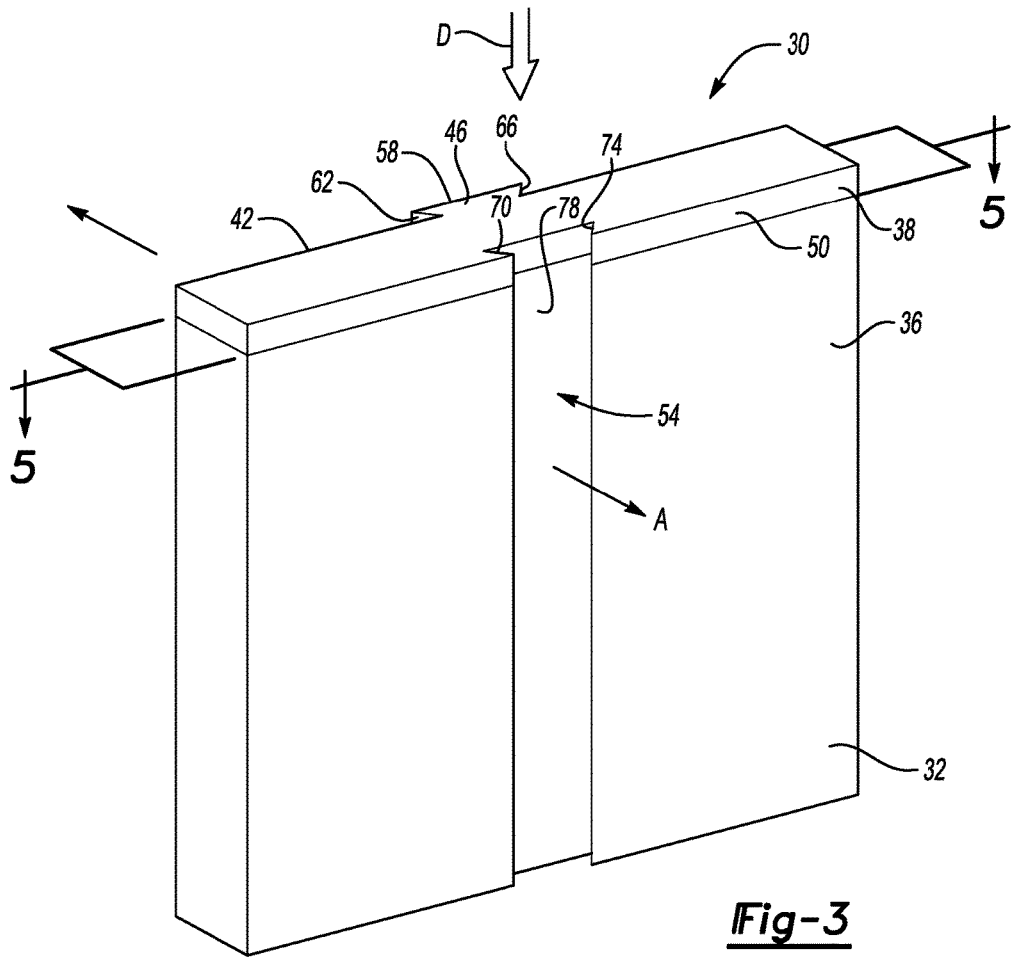
FIG. 3 illustrates a perspective view of a cell assembly from the battery pack of FIG. 2.

This disclosure relates to a traction battery with cell assemblies that are secured together using rails received within slots. The rails can be slidably received within the slots. Terminals of the battery cells are disposed within surfaces of the rails, the slots, or both. The terminals are disposed within surfaces that are relatively protected. Among other things, positioning the terminals within these areas can guard against inadvertent contact with the terminals.

Referring to FIG. 1, an example electrified vehicle 10 includes a battery pack 14, an electric machine 18, and a pair of drive wheels 22. The electric machine 18 can receive electric power from the battery pack 14. The electric machine 18 converts the electric power to torque that drives the drive wheels 22. The battery pack 14 can be considered a relatively high voltage traction battery pack.

The exemplary electrified vehicle 10 is an all-electric vehicle. In other examples, the electrified vehicle 10 is a hybrid electric vehicle (HEV), which can selectively drive the drive wheels 22 with torque provided by an internal combustion engine instead of, or in addition to, the electric machine 18. Further, although described in connection with electrified vehicles, the teachings of this disclosure relating to the battery pack 14 could apply to battery packs that are not incorporated into electrified vehicles. For example, a battery pack incorporated into a home energy storage system could benefit from the teachings of this disclosure.

Referring now to FIG. 2, the battery pack 14 includes an array 26 of cell assemblies 30. The exemplary array 26 includes twelve cell assemblies 30 disposed along a longitudinal axis A. In other examples, the array 26 could include more than twelve cell assemblies 30 or fewer than twelve cell assemblies 30.

Referring now to FIGS. 3-6 with continuing reference to FIG. 2, the example cell assemblies 30 each include a case 32 that receives a battery electrode structure 34 and a terminal connection plate 36. The case 32, among other things, protects the electrode structure 34. The electrode structure 34 can have a jelly roll configuration as is shown, or could be another type of electrode structure, such as a pouch cell or lithium-ion bag-type cell.

The exemplary case 32 includes a primary portion 36 providing an open area that holds the electrode structure 34 and the terminal connection plate 36. A lid 38 that encloses the open area. The lid 38 can be fastened to the primary portion 36 after positioning the electrode structure 34 within the opening. The lid 38 can be welded to the primary portion 36, for example.

The exemplary case 32 further includes a first axial side 42 with a rail 46, and an opposing axial side 50 with a slot 54. When the cell assembly 30 is arranged in an installed position within the array 26, the rail 46 is held within a slot of a cell assembly 30a that is axially adjacent the side 42, and the slot 54 of the cell assembly 30 receives a rail of a cell assembly 30b that is axially adjacent the side 50 (see FIG. 6).

In this example, the rail 46 is slidably received within the slot of the cell assembly 30a to position the cell assembly 30 relative to the cell assembly 30a. The rail of the cell assembly 30b positioned within the slot 54 secures the cell assembly 30b relative to the cell assembly 30. In other examples, the rails are positioned within the respective slots without sliding, such as by snap-fitting the rails within the slot of the slots.

In this example, the case 32 is a metal or metal alloy. The case 32 can be aluminum for example. In some examples, some of the case 32 is formed from a planar blank of material. The rail 46 could be formed, or later fastened to the case 32 via a welding process, for example, or extruded, for example.

The cell assembly 30 can be moved in a direction D relative to the cell assemblies 30a and 30b to position the rail 46 with the slot of the cell assembly 30a, and the rail of the battery assembly 30b within the slot 54. The direction D is perpendicular to the axis A in this example.

Notably, the cell assemblies 30 at the axial ends of the array 26 can omit the rail 46 or the slot 54 if not needed for securing purposes. This omission can reduce an overall axial length of the array 26. The cell assemblies 30 at the axial ends of the array 26 can include terminals that connect the array 26 to other components of the battery pack (e.g., control modules) and that connect the array 26 to other components of the electrified vehicle 10 (e.g., the electric machine 18 of FIG. 1). Other cell assemblies 30 that are not at the axial ends of the array 26 can be used to make the connection to the other components of the battery pack 14 and the electrified vehicle 10 in other examples.

In this example, the rail 46 and the slot 54 are axially misaligned with the electrode structure 34. That is, the electrode structure 34 is contained axially with the case 32 between the side 42 and the floor 78 of the slot 54.

The rail 46 has a dovetail profile. Specifically, the exemplary rail 46 tapers laterally away from the axis A moving outward from the side 42 of the case 32 to an axially outermost surface 58 of the rail 46. Rail surfaces 62 and 66 extend between the side 42 of the case 32 and the axially outermost surface 58 of the rail 46. The rail surfaces 62 and 66 angling laterally outward provides the dovetail profile.

The example slot 54 has a profile generally corresponding to the dovetail profile of the rail of the cell assembly 30b. In this example, opposing slot surfaces 70 and 74 are angled laterally inward from the side 50 of the case 32 to a floor 78 of the slot 54.

When the rail 46 is received within the slot of the cell assembly 30a, the axially outermost surface 58 interfaces directly with the floor of the slot in the cell assembly 30a. When the rail 46 is received within the slot of the cell assembly 30a, the rail surfaces 62 and 66 interface directly with corresponding slot surfaces of the cell assembly 30a When the slot 54 receives the rail of the cell assembly 30b, the floor 78 interfaces directly with the axially outermost surface of the rail in the cell assembly 30b. When the slot 54 receives the rail of the cell assembly 30b, the slot surfaces 70 and 74 interface directly with corresponding rail surfaces of the cell assembly 30b.

The cell assembly 30 includes a first rail terminal 80 disposed within the rail surface 62, and a second rail terminal 84 disposed within the rail surface 66. The cell assembly 30 includes a first slot terminal 88 disposed within the slot surface 70 and a second slot terminal 92 disposed within the slot surface 74. When the cell assembly 30 is in an installed position within the array 26 of FIG. 2, the terminals 80, 84, 88, and 92 electrically contact terminals in axially adjacent cells 30a and 30b (see FIG. 6) so that electrical current can communicate throughout the entire array 26. Notably, the electrical current communicates through the cell assemblies of the array 26 without, in this example, the use of a separate busbar structure outside of the cell assemblies.

Figure 7:
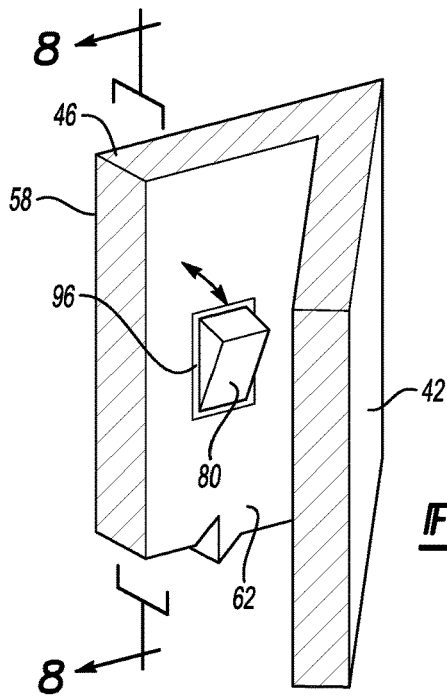
FIG. 7 illustrates a close-up view of a rail terminal disposed within a rail surface of the cell assembly of FIG. 3.
Figure 8:
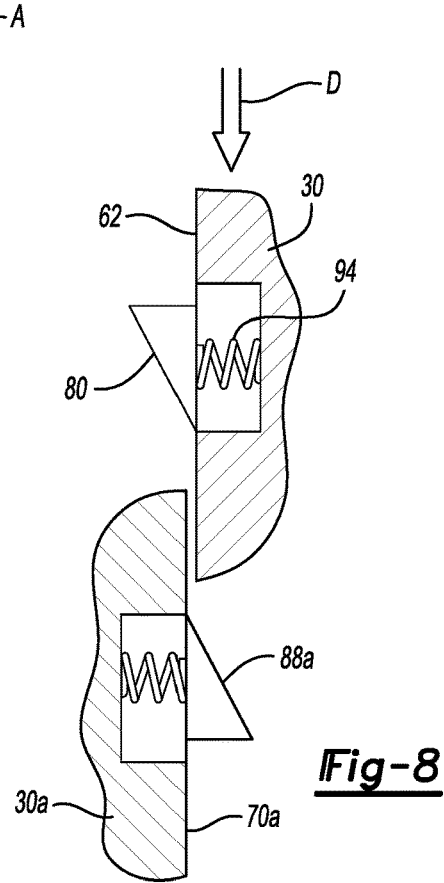
FIG. 8 illustrates a section view taken along line 8-8 in FIG. 7 when the cell assembly is moving toward a fully installed position with another cell assembly.

Referring now to FIGS. 7 and 8, the rail terminal 80 is biased outwardly away from the rail surface 62 of the rail 46 prior to positioning the rail 46 within the slot of the cell assembly 30a in a fully installed position. A spring 94 can be used to bias the rail terminal 80, for example. A grommet 96 can be used to seal areas between the rail terminal 80 and the rail surface 62. The grommet 96 can be rubber for example.

Referring to FIGS. 9 and 10, the cell assembly 30a moves against the rail terminal 80 as the rail 46 slides within the slot of the cell assembly 30a. This contact overcomes the biasing force to press the rail terminal 80 back toward the rail surface 62. Moving the rail terminal 80 toward the rail surface 62 permits the rail 46 to slide to a fully installed position within the slot of the cell assembly 30. In the fully installed position (FIG. 10), the rail terminal 80 electrically contacts a slot terminal 88a disposed in a slot surface 70a of the cell assembly 30a.

The terminals 84, 88, and 92 can be configured similarly to the rail terminal 80 described above in connection with FIGS. 7-10.

Referring again to FIG. 5, the rail terminals 80 and 84, and the slot terminals 88 and 92 communicate electrical current to and from the electrode structure 34.

Notably, the rail terminals 80 and 84, and the slot terminals 88 and 92 are disposed within surfaces that face, at least partially, back toward the electrode structure 34. The rail terminals 80 and 84, and the slot terminals 88 and 92 can be copper, for example.

For example, with reference to the rail surface 62 of the rail 46, the rail surface 62 faces in a direction $S_D$. Relative to the axis A of the array 26, the direction $S_D$ has an axial component directed toward the electrode structure 34 and a lateral component. The axial component directed toward the electrode structure 34 means that the rail surface 66 faces, at least partially, toward the electrode structure 34. The axially outermost surface 58 of the rail 46 faces axially away from the electrode structure 34 of the cell assembly 30, That is, the axially outermost surface 58 faces in a direction having no axial component directed back toward the electrode structure 34.

Positioning the rail terminals 80 and 84, and the slot terminals 88 and 92 within surfaces that face toward the electrode structure 34 of the respective battery cell positions the rail terminals 80 and 84, and the slot terminals 88 and 92 in relatively protected areas. That is, inadvertent contact with the rail terminals 80 and 84, and the slot terminals 88 and 92 is more likely avoided than if, for example, terminals were positioned within the axially outermost surface 58 of the rail 46, or the floor 78 of the slot 54. For example, a user handling the cell assembly 30 is less likely to contact the rail terminal 80 in the rail surface 62 than if the rail terminal 80 were instead disposed within the axially outermost surface 58 of the rail 46. This is because the user's finger is too large to move between the surface 62 and the surface 42 to where the user's fingers could contact the terminal 80.

Although the rail surfaces 62 and 66, and the slot surfaces 70 and 74, each include a single terminal, other numbers of terminals could be used. For example, the rail surface 62 could include the rail terminal 80, and the rail surface 66 could include no terminal. In another example, the rail surface 62 could include both the rail terminal 80 and the rail terminal 84.

Figure 5:
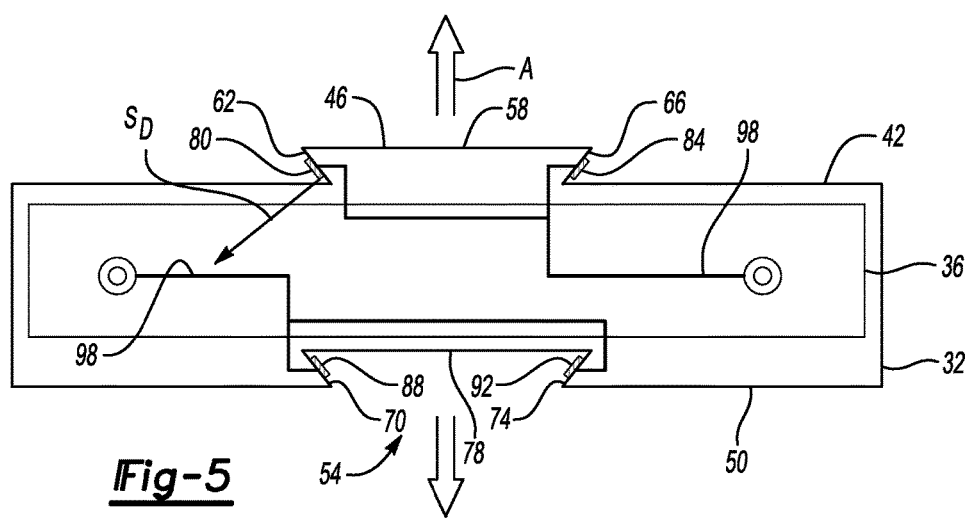
FIG. 5 illustrates a section view taken along line 5-5 in FIG. 3.
Figure 4:
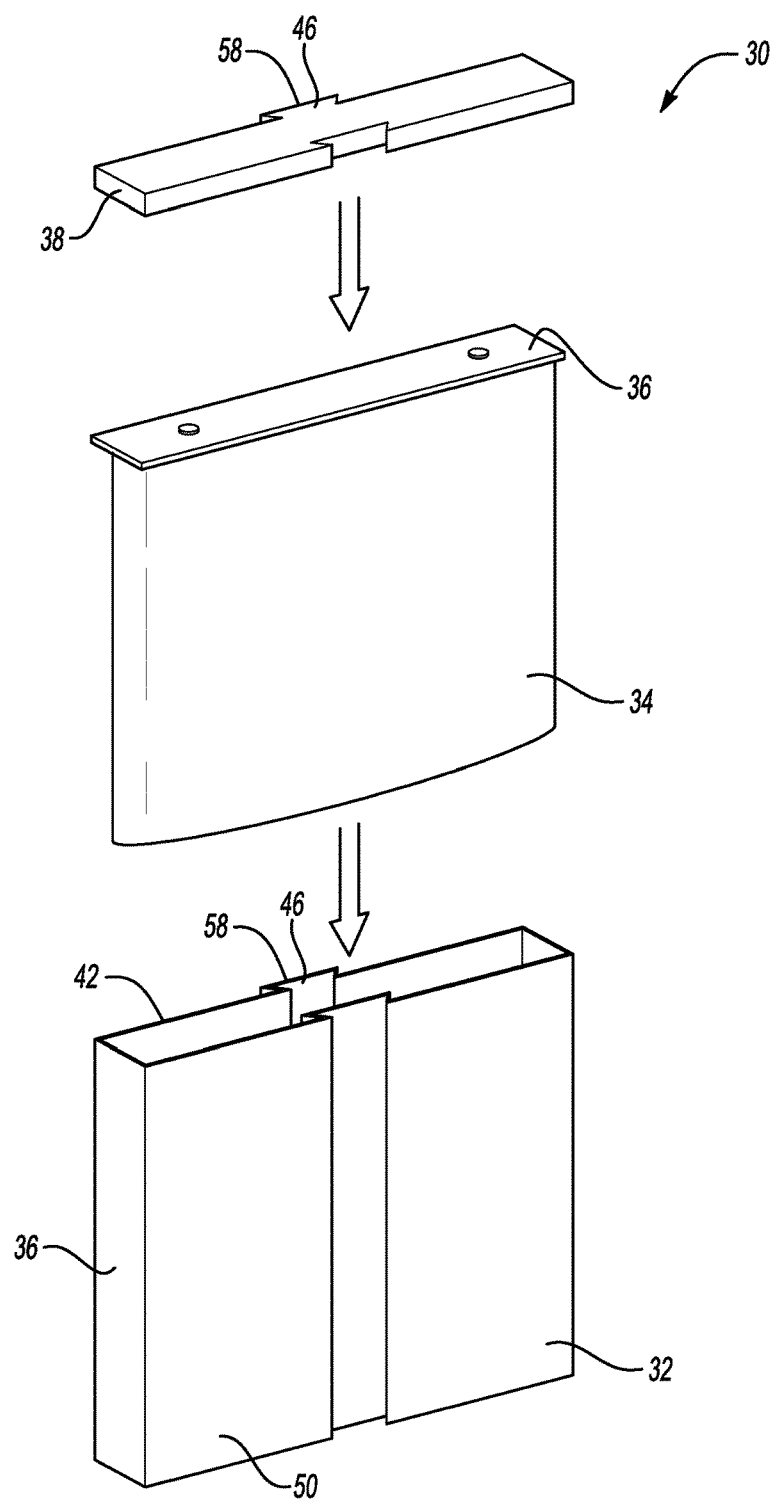
FIG. 4 illustrates an expanded view of the cell assembly of FIG. 3.
Figure 6:
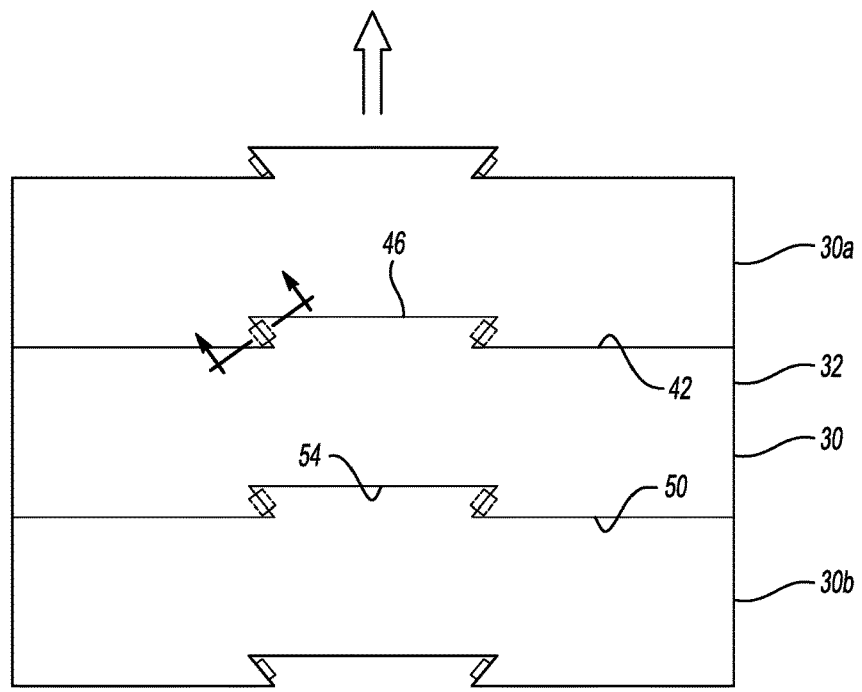
FIG. 6 illustrates a top view of the cell assembly of FIG. 3 interfacing with axially adjacent cell assemblies within the battery pack of FIG. 2.
Figure 12:
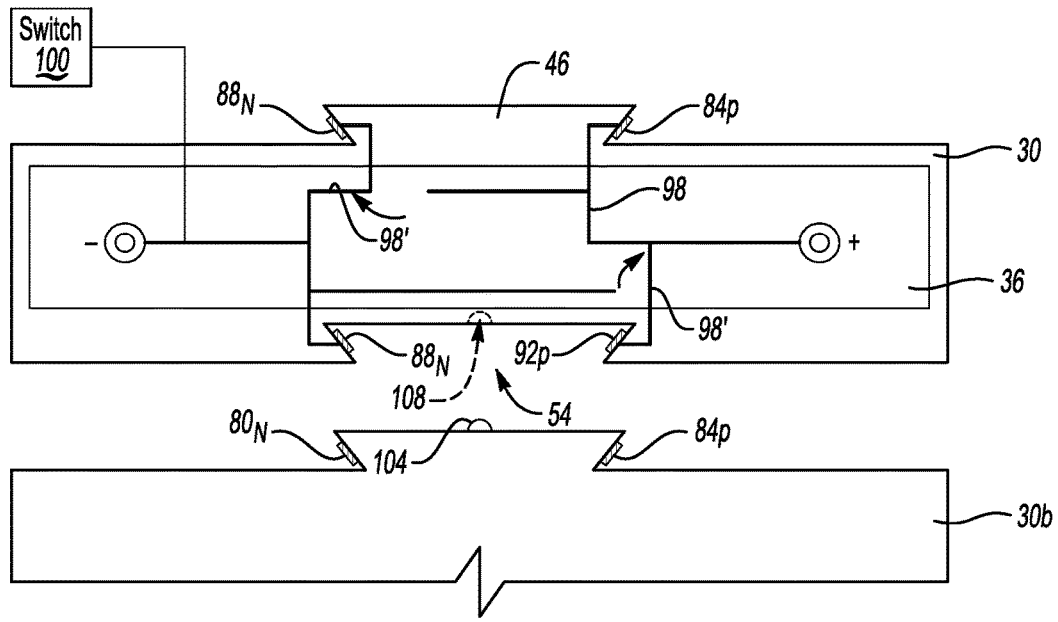
FIG. 12 illustrates a top section view of a portion of the cell assembly of FIG. 11 and another cell assembly in a parallel mode.
Figure 13:
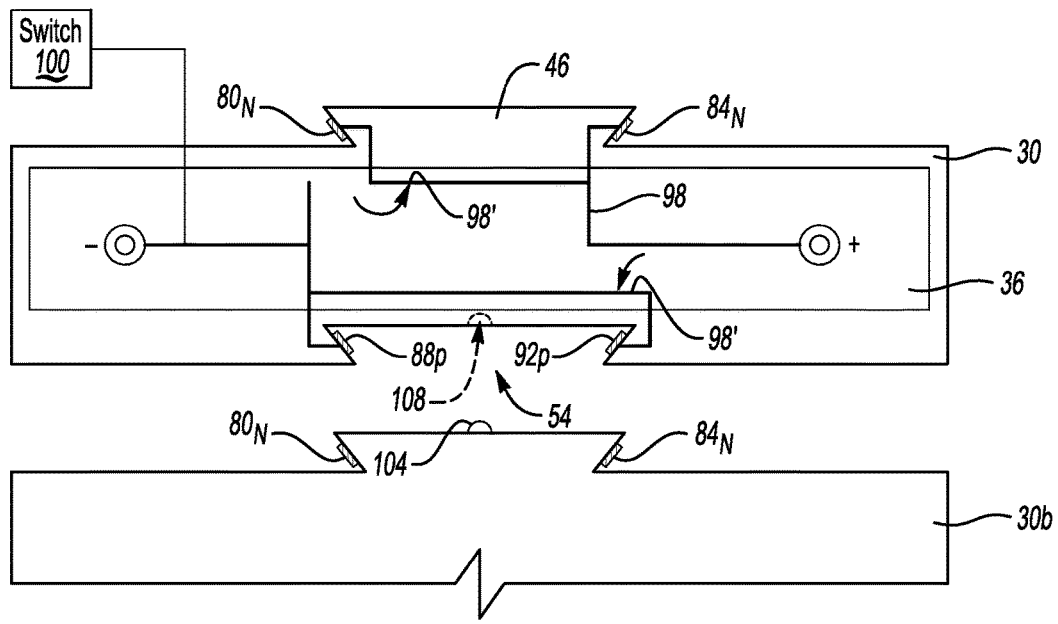
FIG. 13 illustrates the portions of FIG. 12 in a series mode.

Referring now to FIGS. 11-13 with continuing reference to FIGS. 2 and 5, electrical current communicates through positive and negative nodes of the terminal connection plate 36 and electrical connectors 98, such as wires, between the electrode structure 34 and the respective rail terminals 80 and 84, or slot terminals 88 or 92. The terminal connection plate 36 can include a circuitry that is operably connected to a switch 100. The circuitry responds to a position of the switch 100 to control the flow of electrical current between the electrode structure 34 and the terminals 80, 84, 88, and 92.

The exemplary switch 100 is actuatable between parallel mode, a series mode, and an OFF position. Actuating the switch 100 between the parallel mode and the series modes changes how electrical current moves through the cell assemblies 30. That is, the switch 100 can be transitioned to a position that causes electrical current to move through the cell assemblies 30 of the array 26 in a parallel or series type arrangement. Actuating the switch 100 to the OFF position turns off the electrical conductivity of the cell assembly 30 such that the rail terminals 80 and 84, and the slot terminals 88 and 92 do not conduct electrical current. The off position could be used when the cell assembly 30 is transported outside of the array 26 and during assembly. The switch 100 can be, for example, a toggle switch or a slider. The switch 100 can be recessed below, flush with, or on top, for example, of the surface of the case 32.

In FIG. 12, the switch 100 is transitioned to a parallel mode where the slot terminal $88_N$ of the cell assembly 30 is a negative terminal that interfaces with a negative rail terminal $80_N$ in the rail of the cell assembly 30b when the rail is fully installed within the slot 54. Further, in the parallel mode, the slot terminal $92_P$ is a positive terminal that interfaces with a positive rail terminal $84_P$ in the rail of the cell assembly 30b when the rail is fully installed within the slot 54. In the parallel mode, the slot terminal $88_N$ is negative and the slot terminal $92_P$ is positive. In the parallel mode, the rail terminal $80_N$ of the rail 46 of the cell assembly 30 is negative, and the rail terminal $84_P$ of the rail 46 of the cell assembly 30 is positive.

In FIG. 13, the switch 100 is transitioned to a series mode where the slot terminal $88_P$ of the cell assembly 30 is a positive terminal and interfaces with a negative rail terminal $80_N$ in the rail of the cell assembly 30b when the rail is fully installed within the slot 54. Further, in the series mode, the slot terminal $92_P$ is a positive terminal that interfaces with a negative terminal $84_N$ in the rail of the cell assembly 30b when the rail is fully installed within the slot 54. In the series mode, the slot terminals $88_P$ is positive and the slot terminal $92_P$ is positive. In the series mode, the rail terminal $80_N$ in the rail 46 of the cell assembly 30 is negative and the rail terminal $84_N$ of the rail 46 of the cell assembly 30 is negative.

The change between the series mode and parallel mode is represented schematically in FIGS. 12 and 13 by the repositioning of the portions 98' of the electrical connectors 98, which changes the conductive path between the terminal connection plate 36 and the terminals 80, 84, 88, and 92. When the switch 100 is transitioned to the OFF position, the portions 98' could be moved to a position that interrupts the conductive path between the terminal connection plate 36 and the terminals 80, 84, 88, and 92.

In the exemplary cell assembly 30 of FIGS. 2-13, the rail 46 and the slot 54 extend from a first outermost side of the cell assembly 30 to an opposing, second outermost side of the cell assembly 30. Specifically, in this example, the rail 46 and the slot 54 extend from a vertical bottom of the cell assembly 30 to a vertical top of the cell assembly 30.

Other configurations are of the rail 46 and the slot 54 are possible and fall within the scope of this disclosure.

Figure 14:
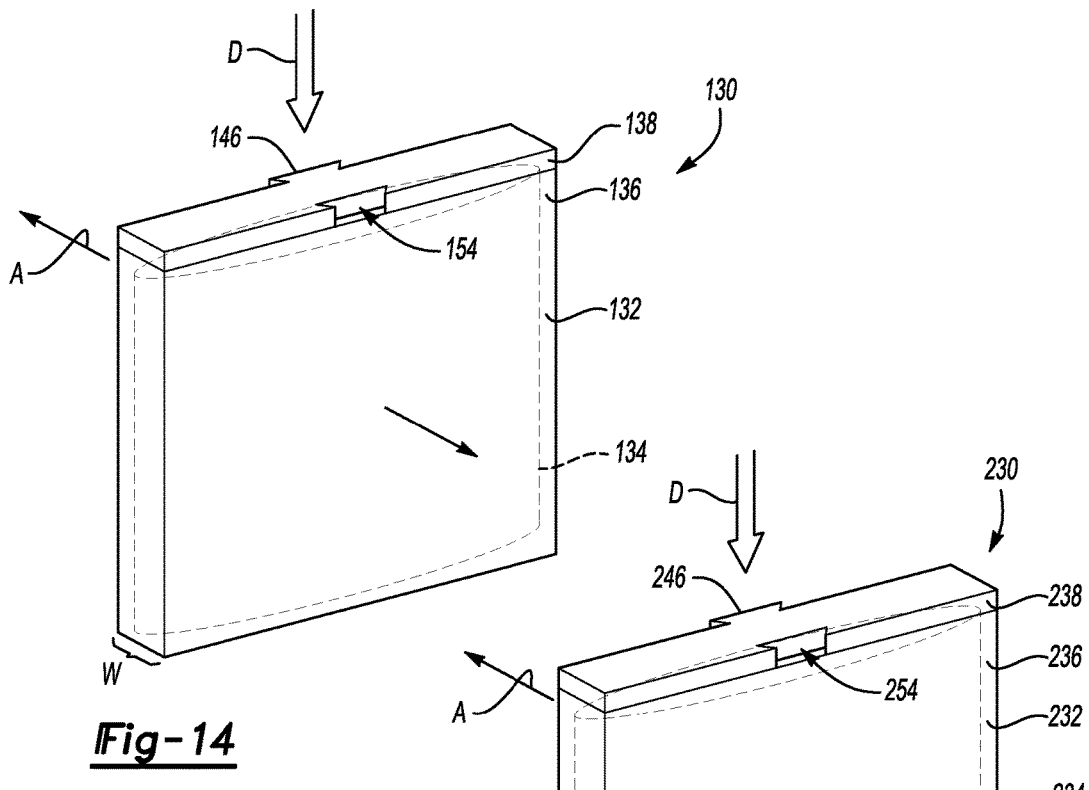
FIG. 14 illustrates a perspective view of a cell assembly according to yet another exemplary embodiment.

For example, with reference to FIG. 14, another exemplary cell assembly 130 includes a rail 146 and a slot 154 that extend only partially along the height of the cell assembly 130. The rail 146 and the slot 154 are, in this example, misaligned with an electrode structure 134 of the cell assembly 130 along the direction D. This can permit the slot 154 to overlap the electrode structure 134 along the axis A, which can reduce an axial width W of the cell assembly 130

The rail 146 and the slot 154 are, in this example, provide by a lid 138 of a case 132 of the cell assembly 130, rather than both the lid 138 and a primary portion 136 of the case 132.

The cells assembly 130 can interlock with similar cell assemblies to provide an array like the array 26 of FIG. 2.

Figure 15:
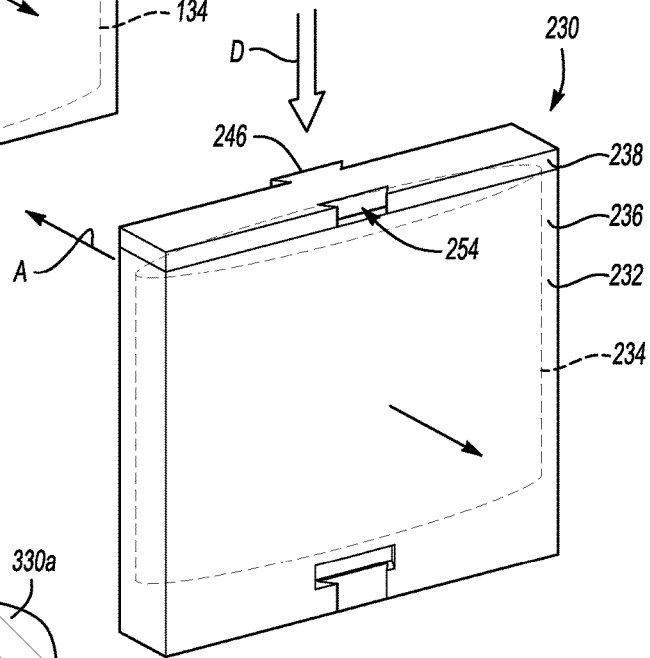
FIG. 15 illustrates a perspective view of a cell assembly according to still another exemplary embodiment.

Referring now to FIG. 15, yet another exemplary cell assembly 230 includes a rail 246 and a slot 254 separated into more than one separate portion. The portions of the rail 246 and the portions of the slot 154 are, in this example, misaligned with an electrode structure 234 of the cell assembly 230 along the direction D. This can permit the portions of the slot 254 to overlap the electrode structure 234 along the axis A, which can reduce and axial width W of the cell assembly 230.

In this example, a lid 238 of the case 232 provides one of the portions of the rail 246 and one of the portions of the slot 254. A primary portion 236 of the case 232 provides the other portion of the rail 246 and the other portions of the slot 254.

The cells assembly 230 can interlock with similar cell assemblies to provide an array like the array 26 of FIG. 2.

In the embodiments of FIGS. 3-15, positioning the rails within the slots can help to compress the cell assemblies 30, 130, and 230 along the axis A. That is, the rails and slots can be designed to pull the cell assembles together axially effectively providing an interference fit. Pulling the cell assemblies together axially can limit expansion of the respective electrode structures during operation, which may be desirable.

In some exemplary embodiments, a locking feature could be used to limit movement of the rail relative to the slot. The locking feature effectively prevents the rail from withdrawing from the slot, which could cause the rail and slot terminals to move out of electrical contact with each other. The locking feature could be a mechanical fastener, such as a threaded fastener. The locking feature could be a dimple 104 of the cell assembly 30b received within a recess 108 of the cell assembly 30 when the rail of the cell assembly 30b is fully inserted within the slot 54 of the cell assembly 30 (see FIGS. 12 and 13). The dimple 104 contacts the sides of the recess 108 to prevent the rail of the cell assembly 30b from withdrawing from the slot 54 of the cell assembly 30.

In some examples, the rail and slot configurations can be utilized instead of, or in addition to, other mechanisms for compressing the cell assemblies 30, 130, and 230 along the axis A. For example, endplates could be eliminated if sufficient compression along the axis A is attainable with the rails received within the slots.

Other examples could use endplates, but less compression would be required from the endplates along the axis A.

Although the embodiments of FIGS. 3-15 utilize rails and slots having a dovetail configuration, other profiles are possible.

Figure 16:
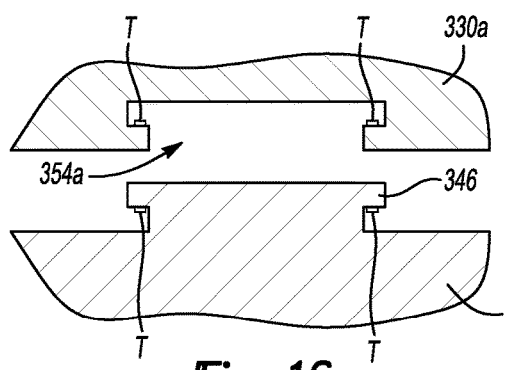
FIG. 16 illustrates a top view of selected portions of battery cell assemblies according to still another exemplary embodiment.

For example, referring to FIG. 16, another example rail 346 of a cell assembly 330 is configured for receipt within a corresponding slot 354a of an axially adjacent cell assembly 330a. The rail 346 and the slot 354a have T-shaped configurations. Terminals T are disposed on surfaces of the rail 346 and the slot 354a that face back toward the respective electrode structures of the cell assemblies 330 and 330a.

Figure 17:
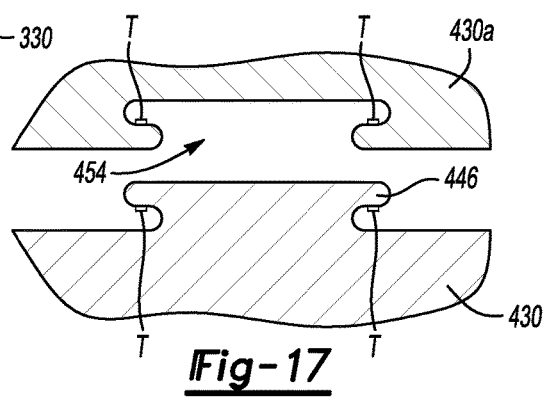
FIG. 17 illustrates a top view of selected portions of battery cell assemblies according to still another exemplary embodiment.

Referring to FIG. 17, yet another exemplary rail 446 of a cell assembly 430 is configured for receipt within a respective slot 454a of an axially adjacent cell assembly 430a. The rail 446 and the slot 454a have curved profiles with curved surfaces. Terminals T are disposed within the curved surfaces of the rail 446 and the slot 454a that face back toward the respective electrode structures of the cell assemblies 430 and 430a.

Although the slots and rails of the cell assemblies are shown on axially facing sides of the cells assemblies in the above exemplary embodiments, other exemplary embodiments could include the slots or rails on other sides of the cell assemblies. For example, with reference to FIG. 18, the laterally facing sides of the cell assemblies 530 include slots $554_L$ in the laterally facing sides in addition to the slots 554 in the axially facing sides.

The slots $554_L$ receive rails $546_L$ extending from the laterally facing sides of a laterally adjacent cell assemblies. The cell assemblies 530 include the rails $546_L$ in addition to the rails 546.

The slots $554_L$ and rails $546_L$ on sides of the cell assemblies other than the axially facing sides could permit the array to have cell assemblies arranged to turn a corner. That is, the overall array could have an "L" shape.

Figure 18:
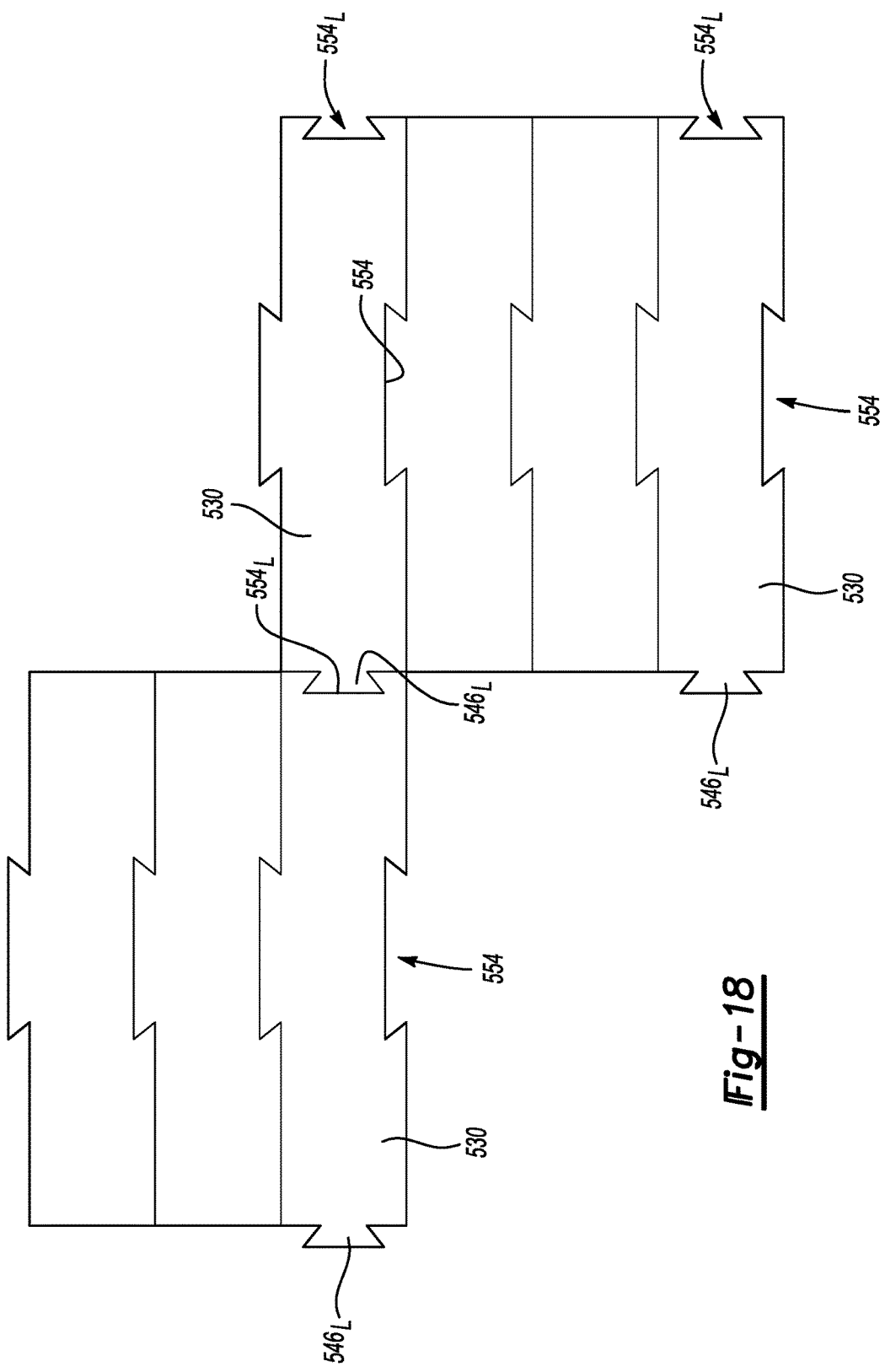
FIG. 18 illustrates a top view of cell assemblies according to still another exemplary embodiment.

Other exemplary embodiments could have slots and rails in other surfaces, such as a vertical top or vertical bottom of the cell assemblies 530 shown in FIG. 18.

Features of the disclosed examples include a cell assembly with a rail received within a slot of another cell assembly to secure the cell assemblies within an array traction battery. The rail, the slot, or both, can include terminals disposed surfaces that face back toward the respective electrode structures of the cell assemblies. Among other things, this positioning shields the terminals from inadvertent contact.

Further, the rail and the slot design resist the expansion of the electrode structures by acting as a rib that adds rigidity to the cell assembly. Also, assembly of an array incorporating the rail and the slot design is simplified as separate fasteners and plates traditionally used to secure the cell assemblies can be reduced or eliminated.

Notably, because the terminals of the cell assemblies interface directly with each other, busbars connecting the terminals can be reduced or eliminated. The busbars are effectively contained within the cell assemblies. That is, no separate bus bar is required to communicate electrical current between first and second cell assemblies because the rail terminal of the first cell assembly electrically contacts a slot terminal of the second cell assembly when the rail is received within the slot. The electrical contact between the rail terminal and the slot terminal can permit communication of electrical current between the first and second cell assemblies without the use of a busbar.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery cell securing assembly, comprising:
a rail of a first cell assembly received within a slot of a second cell assembly to secure the first and a second cell assemblies relative to each other; and
a rail terminal disposed within a rail surface of the rail that faces back toward an electrode structure of the first cell assembly.

2. The battery cell securing assembly of claim 1, wherein the second cell assembly has a slot terminal disposed within a slot surface of the slot that faces an electrode structure of the second cell assembly, the slot terminal electrically contacting the rail terminal when the rail is received within the slot.

3. The battery cell securing assembly of claim 2, wherein the rail extends from a first outermost side of the first cell assembly to an opposite, second outermost side of the first cell assembly, wherein the slot extends from a first outermost side of the second cell assembly to an opposite, second outermost side of the second cell assembly.

4. The battery cell securing assembly of claim 1, wherein the rail includes a first rail portion extending from a first area of the first battery cell, and a separate, second rail portion extending from a second area of the first battery cell.

5. The battery cell securing assembly of claim 1, wherein the first and second cells are disposed along a longitudinal axis of an array when the rail is received within the slot, wherein the rail surface of the rail is an axially facing surface.

6. The battery cell securing assembly of claim 5, wherein the rail is slidably received within the slot in a direction.

7. The battery cell securing assembly of claim 6, wherein the direction is transverse to the longitudinal axis.

8. The battery cell securing assembly of claim 1, wherein the rail surface that faces the electrode structure faces in a direction having an axial component and a lateral component.

9. The battery cell securing assembly of claim 1, wherein the rail has a dovetail configuration.

10. The battery cell securing assembly of claim 1, wherein the rail terminal of the first cell assembly electrically contacts a slot terminal of the second cell assembly when the rail is received within the slot to communicate electrical current between the first and second cell assemblies such that no separate bus bar is required to communicate electrical current between the first and second cell assemblies.

11. The battery cell securing assembly of claim 1, wherein the rail terminal is biased outward away from the rail surface that faces the electrode structure.

12. A battery cell securing method, comprising:
positioning a rail of a first cell assembly within a slot of a second cell assembly to secure the first and second cell assemblies relative to each other, the rail having a rail surface that faces back toward an electrode structure of the first cell assembly, and a rail terminal disposed within the rail surface.

13. The battery cell securing method of claim 12, further comprising positioning the rail within the slot such that the rail terminal electrically contacts a slot terminal disposed within a slot surface of the slot that faces an electrode structure of the second cell assembly.

14. The battery cell securing method of claim 13, wherein the rail extends from a first outermost side of the first cell assembly to an opposite, second outermost side of the first cell assembly, wherein the slot extends from a first outermost side of the second cell assembly to an opposite, second outermost side of the second cell assembly.

15. The battery cell securing method of claim 12, wherein the rail includes a first rail portion extending from a first area of the first battery cell, and a separate, second rail portion extending from a second area of the first battery cell.

16. The battery cell securing method of claim 12, wherein the first and second cells are disposed along a longitudinal axis of an array when the rail is received within the slot, wherein the rail surface of the rail is an axially facing surface.

17. The battery cell securing method of claim 16, wherein the rail is slidably received within the slot in a direction that is transverse to the longitudinal axis.

18. A battery cell securing method, comprising:
positioning a rail of a first cell assembly within a slot of a second cell assembly to secure the first and second cell assemblies relative to each other, the rail having a rail surface that faces back toward an electrode structure of the first cell assembly, and a rail terminal disposed within the rail surface; and
during the positioning, pressing the rail terminal into the rail to oppose a biasing force that biases the rail terminal outward away from the rail surface.

19. The battery cell securing method of claim 12, further comprising pressing the rail terminal using a slot surface of the slot.

20. The battery cell securing method of claim 12, wherein the positioning comprises sliding the rail relative to the slot.

* * * * *

UNITED STATES PATENT AND TRADEMARK OFFICE
CERTIFICATE OF CORRECTION

PATENT NO. : 10,263,236 B2
APPLICATION NO. : 15/598689
DATED : April 16, 2019
INVENTOR(S) : Bridget Jo Volinski, Christian Hines and John Scott Turik Page 1 of 1

It is certified that error appears in the above-identified patent and that said Letters Patent is hereby corrected as shown below:

In the Claims

In Claim 1, Column 9, Line 41; replace "first and a second" with --first and the second--

In Claim 15, Column 10, Line 41; replace "the first battery cell" with --the first battery cell assembly--

In Claim 15, Column 10, Line 42; replace "the first battery cell" with --the first battery cell assembly--

In Claim 16, Column 10, Line 44; replace "the first and second cells" with --the first and second cell assemblies--

Signed and Sealed this
Second Day of July, 2019

Andrei Iancu
*Director of the United States Patent and Trademark Office*